United States Patent [19]
Lin et al.

[11] Patent Number: 4,748,453
[45] Date of Patent: May 31, 1988

[54] SPOT DEPOSITION FOR LIQUID INK PRINTING

[75] Inventors: Larry W. Lin, Cupertino; Stuart L. Claassen, Santa Clara; Chein-Hwa Tsao, Burlingame, all of Calif.

[73] Assignee: Xerox Corporation, Stamford, Conn.

[21] Appl. No.: 76,088

[22] Filed: Jul. 21, 1987

[51] Int. Cl.[4] ............................................. G01D 15/16
[52] U.S. Cl. ................................. 346/1.1; 346/140 R; 400/121; 400/126
[58] Field of Search ...................... 346/1.1, 140, 135.1; 400/126, 121; 358/75

[56] References Cited

U.S. PATENT DOCUMENTS

| | | | |
|---|---|---|---|
| 4,367,482 | 1/1983 | Heinzl | 346/140 |
| 4,593,295 | 6/1986 | Matsufuji | 346/140 |
| 4,617,580 | 10/1986 | Miyakawa | 346/140 X |

Primary Examiner—Joseph W. Hartary
Attorney, Agent, or Firm—Serge Abend

[57] ABSTRACT

A method of depositing spots of liquid ink upon selected pixel centers on a substrate having poor ink absorptive properties so as to prevent the flow of liquid ink from one spot to an overlapping adjacent one. The line of information is printed in at least two passes so as to deposit spots of liquid ink on selected pixel centers in a checkerboard pattern wherein only diagonally adjacent pixel areas are deposited in the same pass. On the second pass the complementary checkerboard pattern is deposited. Ink is not deposited on horizontally or vertically adjacent pixel areas during the single pass since the spots on these adjacent areas have overlapping portions.

8 Claims, 5 Drawing Sheets

Y C M B

SPOT DEPOSITION FOR LIQUID INK PRINTING

FIELD OF THE INVENTION

The present invention relates to a liquid ink recording apparatus and, more particularly, to a sequencing pattern for depositing spots of ink upon an overhead projection transparency film so as to achieve a high quality print.

BACKGROUND OF THE INVENTION

Liquid ink printing may take a number of forms. In ink jet printing, exemplified by U.S. Pat. No. 4,544,931 (Watanabe et al), a liquid droplet is ejected from a single scanning nozzle and in U.S. Pat. No. 4,593,295 (Matsufuji et al) liquid droplets are ejected from multi-nozzle, multi-color heads arranged for scanning; in electroosmotic ink recording, exemplified by U.S. Pat. No. 4,383,265 (Kohashi) ink droplets are made to fly from the tip of a needle shaped recording electrode; similarly, in electrostatic ink ejection, exemplified by U.S. Pat. No. 4,166,277 (Cielo et al), ink is retained in holes of an ink reservoir and is attracted out of the holes by the selective application of a voltage between the ink and selected electrodes; and in acoustic ink printing, exemplified by U.S. Pat. No. 4,308,547 (Lovelady et al), a liquid drop emitter focusses acoustic energy to eject a liquid ink. Our invention for sequencing the pattern of depositng ink droplets has equal applicability to each of these types of recording devices. It relates to the deposition of liquid ink onto selected pixel centers on command.

In a liquid ink recording apparatus, image quality is greatly affected by the physical properties of the recording substrate because the ink composition comprises more than 95% carrier liquid compared with only a small percentage of a suitable dye. The carrier liquid may be, for example, about 40% ethylene glycol and about 60% water. Since the desired marking material is only the dye portion, the remaining fluid must be driven off or absorbed into the recording substrate. This does not present a major problem with a paper recording substrate, because the paper has an affinity for the liquid. In fact, special coatings are usually applied to it for modifying and optimizing the diffusion isotropicity, diffusion speed, adsorption speed and reflection density of the deposited ink spots.

It is well known, however, that recording substrates of the overhead projection transparency film type present a problem in achieving high image quality because they have a poor ink spot diffusion capability. Although special coatings have been developed to shorten the ink drying time, the underlying Mylar ® material is substantially liquid impervious and the drying time of liquid ink on these films does not approach the drying time on paper substrates. We have determined that it is the overlapping of still wet ink spots on adjacent pixel centers that causes a major image degradation problem referred to as "beading". When these adjacent ink spots impact the substrate and spread, ink from one spot will overlap into the region occupied by the other. This contact will disrupt the surface tension of the spots and ink will be drawn into the overlap zone depleting a portion of the ink from the remainder of the spot. As a result, the ink coverage will be non-uniform, causing a beaded, mottled appearance with alternate areas of high and low color saturation. This problem is aggravated when color mixing is required, since, in that case, each pixel area must be comprised of at least two superimposed droplets of ink and there is more ink to flow and bead between adjacent pixel areas.

In U.S. Pat. No. 4,617,580 (Miyakawa) there is taught a ink jet printing method for depositing drops of ink upon an overhead transparency film so as to obtain high color saturation. It is recognized therein that such a film does not absorb ink. In accordance with the Miyakawa invention, a plurality of smaller ink droplets are ejected onto a normal single-pixel area with the droplets being shifted slightly from one another by a predetermined distance. In FIGS. 3, 4 and 5, of the U.S. Pat. No. 4,617,580, there is shown a single pixel area upon which there are deposited, respectively, three, four and five smaller ink droplets.

In U.S. Pat. No. 4,575,730 (Logan et al) the non-uniform appearance of large area ink jet printing, referred to as "corduroy texture of washboard appearance" is attributed to non-uniform ink thickness "due to the thixotropic properties and surface tension". Better quality is attempted to be achieved by random overlapping of ink spots.

Although our invention will be described relative to a four-color multi-head scanning ink jet apparatus wherein each head is provided with plural nozzles, it should be understood that it is equally applicable to other liquid ink spot printing systems. In all these systems the spots are generally circular and high quality printing of graphic images, particularly solid areas, is achieved by overlapping adjacent spots so as to avoid uninked ("white") portions between ink spots. We have found that beading will inevitably occur on transparency film when overlapping spots of adjacent pixel areas are deposited while the liquid ink is still free to flow.

Therefore, it is the primary object of this invention to provide a method of depositing liquid ink spots upon an overhead projection transparency film, or the like, which will avoid ink flowing and beading between adjacent pixel areas, yet will result in output copy having good color saturation.

It is another object of this invention to provide a method of liquid ink spot deposition upon an overhead projection transparency film, or the like by which there will be no color banding between adjacent scanned lines of print when color mixing is effected.

SUMMARY OF THE INVENTION

These objects may be accomplished by printing a line of information in at least two passes so as to deposit spots of liquid ink on selected pixel centers in a checkerboard pattern. Diagonally adjacent pixel areas are deposited in the same pass so that there will be no overlap of ink spots from adjacent pixel areas when the ink is still in a flowable state. A second pass deposits the alternate diagonally adjacent pixel areas in either a reverse or same direction pass. When color mixing is accomplished and the second pass is opposite to the first pass, each horizontally and vertically adjacent pixel area will be of a different color. Color banding will be avoided, and because of the inability of perception of the color difference between horizontally and vertically adjacent pixel areas, the printed area will have the appearance of uniform color.

BRIEF DESCRIPTION OF THE DRAWINGS

Other objects and further features and advantages of this invention will be apparent from the following, more particular, description considered together with the accompanying drawings, wherein.

DESCRIPTION OF THE PREFERRED EMBODIMENT

Figure 1:
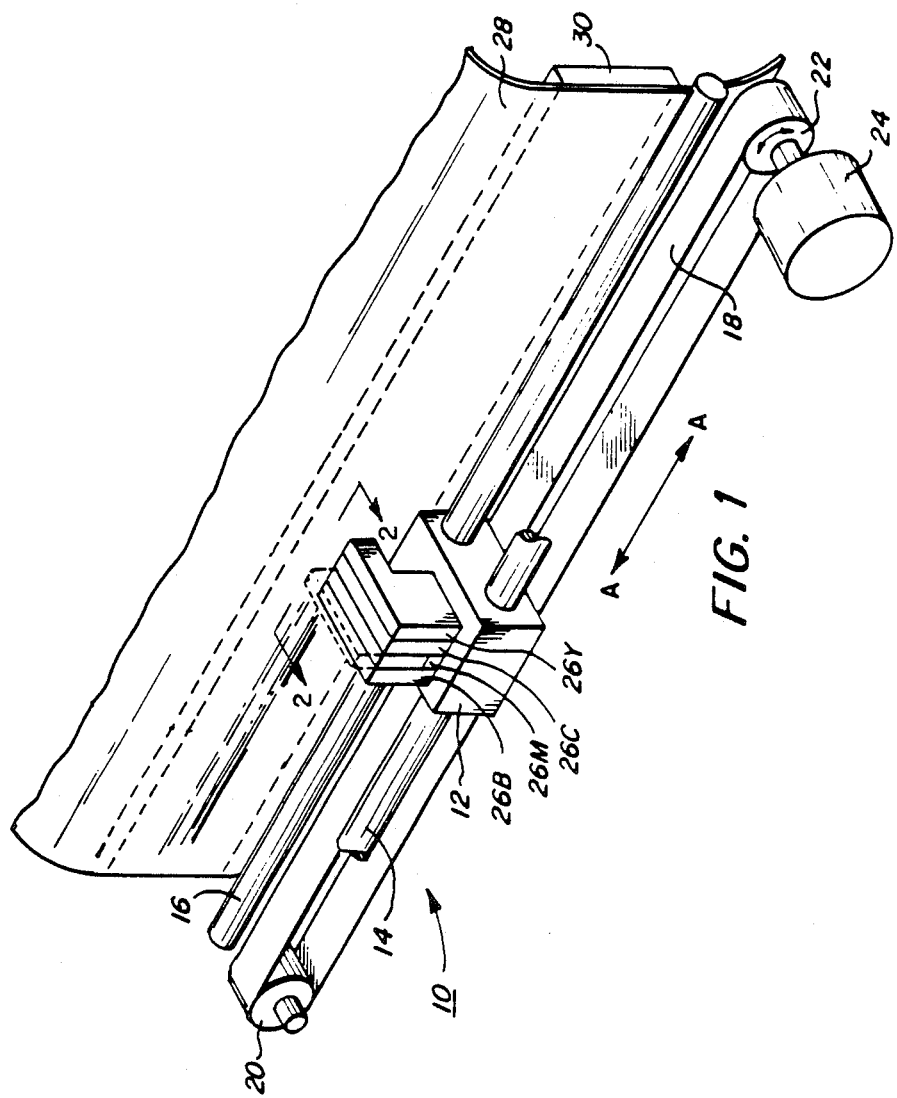
FIG. 1 is a perspective view schematically illustrating a multi-color, multi-head, scanning-type ink jet printer.

Turning now to FIG. 1, there is shown a multi-color, multi-head printing mechanism 10 including a carriage 12 mounted for reciprocation (in the direction of arrow A—A) upon guide rails 14 and 16 secured to a frame (not shown) of the printer. The carriage is driven rightwardly and leftwardly upon the guide rails by any suitable mechanism such as a drive belt 18 supported between idler pulley 20 and drive pulley 22, and driven by motor 24. In order to make full-color recordings, recording head cartridges 26Y, 26C, 26M and 26B (for delivering yellow, cyan, magenta and black ink) may be mounted in their respective cartridge holders, provided on the carriage 12. Each cartridge holder will include the appropriate mechanical, electrical and fluidic couplings for its respective head cartridge, so that selected ink drivers may be activated in response to a suitable drive signal to expel ink onto a recording substrate 28 supported upon a platen 30. Although the substrate may be formed of any suitable material, such as paper, our invention has particular advantages for use with overhead transparency films.

Figure 2:
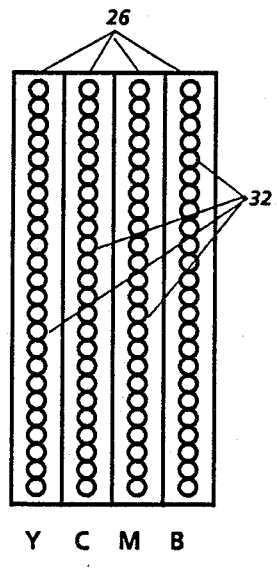
FIG. 2 is a view taken in the direction of line 2—2 of FIG. 1, illustrating the nozzle arrays of the multi-color, multi-head, recording head assembly.

In FIG. 2, it can be seen that each head cartridge 26 (Y, C, M and B) is provided with an array of aligned nozzles 32 (schematically illustrated as being of circular cross-section). For a resolution of 300 spots per inch (spi), each nozzle would be on the order of 2 mils in diameter and located on a 3.3 mil centers. By appropriately spacing the head cartridge from the recording substrate, this arrangement results in spots on vertically aligned pixel centers spaced 3.3 mils apart. For obtaining the same horizontal resolution, the firing rate of the nozzles must be controlled so that the spots are also deposited onto 3.3 mil pixel centers.

Figure 3:
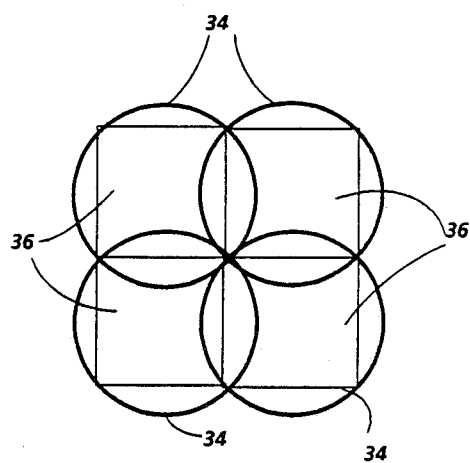
FIG. 3 illustrates the location of four adjacent ink spots relative to their pixel areas for high quality printing.

In order to achieve high quality print copy it is desired that there be complete area coverage with no "white" spaces between spots. This requires the relationship of spots 34 to pixel 36 to be as illustrated in FIG. 3. By selecting a spot size diameter to be substantially equal to $\sqrt{2}$ times the pixel center-to-center distance, the spot size will be about 4.7 mils in diameter. Diagonally adjacent spots will just touch while horizontally and vertically adjacent spots will overlap, resulting in 100% pixel area coverage.

Figure 4:
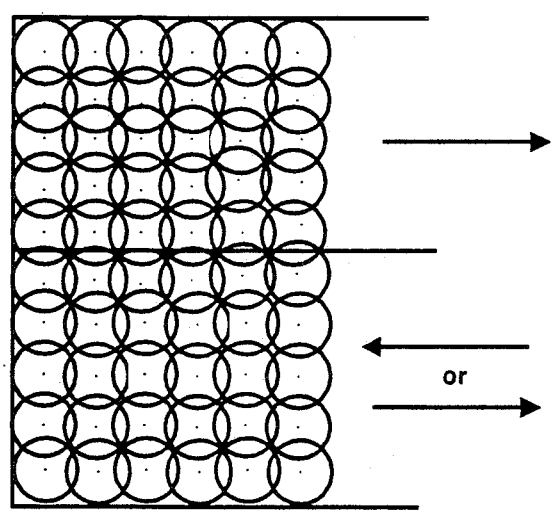
FIG. 4 illustrates two serial line scans deposited in the known deposition sequence.

A representation of two subsequent scan lines deposited in the known manner, is shown in FIG. 4. Solid area coverage is obtained by firing all of the vertical nozzles, simultaneously, at each horizontal position. Every pixel area is covered. At a drop deposition rate of 3 KHZ, horizontally aligned spots are deposited about 0.3 milliseconds apart. After the first line has been printed, the second line may be printed on the return stroke of the carriage, or it may be printed on a second forward stroke. The sequence of spot placement is satisfactory for printing upon a paper substrate because the ink is rapidly absorbed into the paper and dries rapidly relative to the placement of horizontally and vertically adjacent spots. Unfortunately, because of the poor absorptive properties of overhead transparency film, the print quality obtained by the same spot placement and timing is unsatisfactory. We know that on a transparency film the liquid ink takes longer to dry and that it will take about 0.1 to 0.2 seconds after deposition for an ink drop to be sufficiently tacky to receive an overlapping drop without beading. There appears to be an inherent conflict in the print quality requirements of the known deposition sequence. On the one hand, in order to achieve the intense color saturation desired for projection purposes, total ink area coverage and overlapping of the spots is desirable, while on the other hand, horizontal and vertical overlapping of ink between adjacent spots, while it is still in its flowable state, as illustrated in FIG. 4, will cause non-uniformities attributed to beading.

Figure 5A:
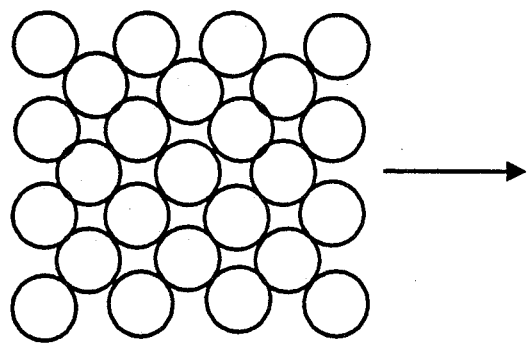
FIGS. 5A and 5B illustrate the location of selectively deposited liquid ink spots, in accordance with this invention, on a first and second line pass, respectively.
Figure 5B:
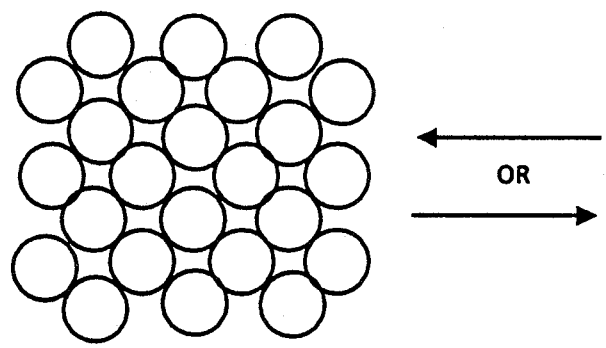

In our sequencing pattern for depositing spots upon a transparency film, at least two passes are required per line. We use the checkerboard deposition pattern shown in FIGS. 5A and 5B for placing only diagonally adjacent spots in a single pass. On a first pass one set of diagonal spots is deposited and on a subsequent pass (in either the reverse or same direction) the complementary set of diagonal spots is deposited. The resultant pixel area coverage will be the same as that shown in FIG. 3, but since the second pass will be deposited more than 0.2 seconds after the first array of spots, the ink will not flow freely. There is no significant overlapping of flowable ink spots in a single pass as the diagonally adjacent spots barely touch one another. Thus, although the liquid ink in each spot is still in a flowable state, it does not affect the surface tension of its neighbors. According to this method there will be no beading and color saturation will be excellent due to the approximately 160% total ink coverage (100% pixel area coverage plus about 60% overlap coverage).

In spite of the fact that two passes are required in our deposition pattern sequence, there will be relatively little, if any, adverse impact upon marking speed which is limited by jetting frequency. Since each jet is fired only at every other horizontal pixel location, the traverse speed of each pass can be doubled. For example, if the known deposition process is accomplished at 10 ips, our deposition process can be accomplished in two passes of about 20 ips. Of course, there may be some slight speed reduction due to runout and drive reversal in a bidirectional mode of operation and a somewhat slower operation yet if the carriage must be returned to its starting position for a second pass in the same direction.

Figure 6A:
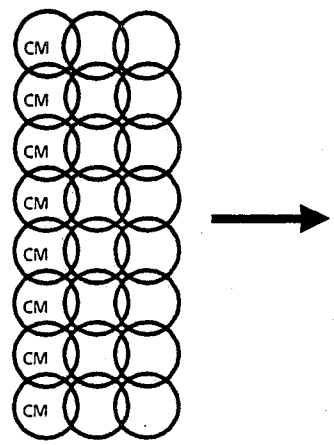
FIGS. 6A and 6B illustrate the deposition of multi-color spots on a first and second line pass, respectively, in accordance with the known deposition sequence.
Figure 6B:
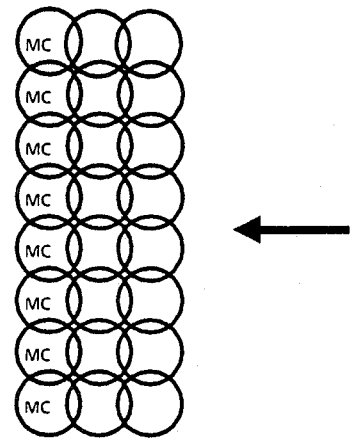

The above print pattern sequence has been described relative to the printing of the single colors black, yellow, magenta and cyan. When mixed colors are to be printed, one color spot is placed on top of another. For example, magenta and yellow yields red, yellow and cyan yields green and magenta and cyan yields blue. It is well known that subtractive color mixing will result in slightly different colors depending upon the order in which the inks are deposited. Therefore, the blue created by magenta upon cyan will differ in color hue from that created by cyan upon magenta. When mixed color printing is effected bidirectionally, one line at a time, in accordance with the well known ink jet printing methods, as illustrated in FIGS. 6A and 6B, the placement of the head cartridges 26 requires that the order of overlap of the inks be reversed from line to line. This causes a disagreeable condition known as "color banding" wherein alternate lines of a single color area are different color hues.

Figure 7A:
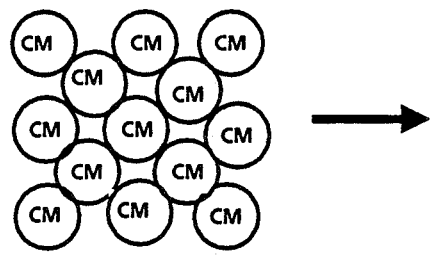
FIGS. 7A and 7B illustrate the deposition of multi-color spots on a first and second line pass in accordance with the present invention.
Figure 7B:
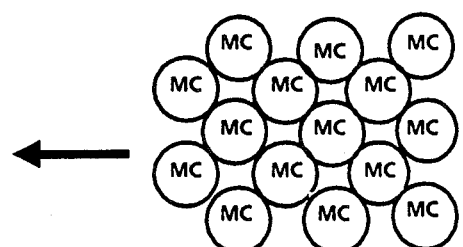

Although mixed colors are formed by totally overlapping one color spot over another, there will be no beading relative to a single superimposed pixel area. Beading will still be a problem vis-a-vis horizontally and vertically adjacent mixed color spots if the known deposition sequence of FIGS. 6A and 6B is followed. However, by depositing the mixed color spots in the same checkerboard patterns as shown in FIGS. 7A and 7B beading will not occur, for the reasons explained above. It should be borne in mind that each pixel area will contain more ink and a somewhat longer period of time is needed to tackify the ink before the second complementary checkerboard pattern may be deposited. Since there is so much more ink deposited excellent color saturation will be obtained.

In addition to aggravated beading, due to the large quantity of flowable ink in each spot in mixed color printing, the color banding problem described above will occur when printing, in the known deposition sequence, in a bidirectional mode. In U.S. Pat. No. 4,593,295 (Matsufuji et al) the problem is solved, in one manner, by the provision of a tandem print head having two sets of reverse order mounted head cartridges for each color. In our invention color banding is eliminated despite the fact that the color ordering is reversed in a reverse printing pass. The reason will be apparent from an observation of FIGS. 7A and 7B. It can be seen that the different mixed color spots (i.e., magenta over cyan and cyan over magenta) will be positioned in an alternating checkerboard pattern rather than in alternating lines so that the colors blend and any difference will not perceptible.

In operation of a liquid ink printer in accordance with our invention, a suitable substrate will be fed into the machine. This recording medium may be either paper or an overhead transparency film. Its nature will either be sensed automatically by a suitable detector (usually a reflectivity or transmissivity device) in the printer or by the operator. In either case, a switch will be set to control the spot pattern sequence. If paper is detected, then the known printing sequence of FIG. 4 is effected. If transparency film is detected, the mode of operation will be switched to our multiple pass checkerboard print pattern sequence with its attendant advantages.

It should be understood that the present disclosure has been made only by way of example, and that numerous changes in details of construction and the combination and arrangement of parts may be resorted to without departing from the true spirt and scope of the invention as hereinafter claimed.

What is claimed:

1. A method for improving graphic image formation generated by a liquid ink spot printing system so as to prevent non-uniform printing caused by ink beading, said method being characterized by depositing spots of liquid ink on selected abutting horizontal and vertical pixel areas on a substrate and comprising the steps of
providing a substrate,
providing liquid ink spot producing means adjacent said substate capable of simultaneously depositing a number of spots onto said substrate on command, selectively energizing said liquid ink spot producing means for producing droplets of liquid ink and for propelling said droplets to said substrate where they form liquid ink spots, for depositing a first pattern of ink spots on an area of said substrate, including first spots located upon alternating horizontal and vertical pixel areas, each of said first spots being of a size so that diagonally adjacent ones are substantially in perimeter contact, and for depositing a second pattern of ink spots on said area of said substrate, including second spots located upon alternating horizontal and vertical pixel area, each of said second spots being of a size so that diagonally adjacent ones are substantially in perimeter contact, said second pattern being complementary to said first pattern.

2. The method for improving graphic image formation generated by a liquid ink spot printing system as defined in claim 1 wherein portions of spots of said first pattern overlap portions of spots of said second pattern.

3. The method for improving graphic image formation generated by a liquid ink spot printing system as defined in claim 1 wherein the step of depositing said second pattern is initiated after the last deposited spots of said first pattern have achieved a tacky condition.

4. The method for improving graphic image formation generated by a liquid ink spot printing system as defined in claim 1 comprising the further step of detecting the nature of said substrate, determining whether said substrate is paper or transparency film, and carrying out said steps of depositing if said substrate is transparency film.

5. The method for improving graphic image formation generated by a liquid ink spot printing system as defined in claim 1 wherein said step of depositing said first pattern is achieved by moving said liquid ink spot producing means relative to said area of said substrate in a first pass, and said step of depositing said second pattern is achieved by moving said liquid ink spot producing means relative to said area of said substrate in a second pass.

6. The method for improving graphic image formation generated by a liquid ink spot printing system as defined in claim 1 wherein the diameters of said first and second spots are $\sqrt{2}$ times the center-to-center distance between adjacent horizontal and vertical pixels.

7. The method for improving graphic image formation generated by a liquid ink spot printing system as defined in claim 1 characterized by providing liquid ink spot producing means for depositing spots of different colors, and sequentially energizing said spot producing means for depositing spots of different colors, so as to deposit spots of different colors at the same pixel locations.

8. The method for improving graphic image formation generated by a liquid ink spot printing system as defined in claim 7 wherein on said second pass the order of color spots deposited on the said complementary pixel locations is the reverse of the order of color spots deposited on said first pass.

* * * * *